US012664867B2

(12) United States Patent
Naik

(10) Patent No.: US 12,664,867 B2
(45) Date of Patent: Jun. 23, 2026

(54) DUAL-LENS SMOKE DETECTION SYSTEM

(71) Applicant: Tyco Fire & Security GmbH, Neuhausen am Rheinfall (CH)

(72) Inventor: Nilesh Ashok Naik, Pune (IN)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 126 days.

(21) Appl. No.: 18/462,192

(22) Filed: Sep. 6, 2023

(65) Prior Publication Data

US 2025/0078638 A1 Mar. 6, 2025

(51) Int. Cl.
  G08B 17/107 (2006.01)
  G01N 15/06 (2006.01)
  G01N 15/075 (2024.01)

(52) U.S. Cl.
  CPC ........... G08B 17/107 (2013.01); G01N 15/06 (2013.01); G01N 15/075 (2024.01)

(58) Field of Classification Search
  CPC ........... G01N 33/0075; G01N 33/0031; G01N 33/0006; G01N 33/0065; G01N 21/84; G01N 33/00; G01N 2015/0046; G01N 1/2247; G01N 1/2273; G01N 1/4022; G01N 15/02; G01N 15/0272; G01N 15/0606; G01N 15/10; G01N 2001/002; G01N 2015/0288; G01N 2015/1022; G01N 27/02; G01N 21/80; G01N 2201/102; G01N 33/004; G01N 27/121; G01N 27/125; G01N 2021/158; G01N 2021/3137;

(Continued)

(56) References Cited

U.S. PATENT DOCUMENTS

2006/0139647 A1 * 6/2006 Tice ........................ G01N 21/15
  356/437
2011/0221889 A1 * 9/2011 Knox ................... G08B 17/107
  348/135

(Continued)

FOREIGN PATENT DOCUMENTS

DE 102015009938 A1 * 2/2017 ............. G01N 21/47
EP 3082117 A1 10/2016

(Continued)

OTHER PUBLICATIONS

Extended European Search Report issued Jan. 31, 2025 for European Patent Application No. 24198549.8.

*Primary Examiner* — Michael P Stafira
(74) *Attorney, Agent, or Firm* — ArentFox Schiff LLP

(57) ABSTRACT

Example implementations include a method, apparatus and computer-readable medium for smoke detection using a smoke detector/fire alarm system implemented as a beam receiver and beam transmitter. In some examples, the beam receiver is configured to receive a plurality of beam pairs including a first beam pair, wherein each beam pair is received via one of a plurality of receive elements, and wherein the first beam pair is received via a first receive element and comprises a first beam and a second beam. In some examples, the beam receiver is further configured to compare a first delta between the first beam intensity and the second beam intensity at the first time instance with a second delta between the first beam intensity and the second beam intensity at the second time instance to determine whether to perform an action.

20 Claims, 12 Drawing Sheets

(58) Field of Classification Search
CPC .......... G01N 2021/3166; G01N 21/15; G01N 21/314; G01N 21/3504; G01N 2201/1214; G01N 2201/1273; G01N 27/4075; G01N 29/14; G01N 2027/222; G01N 27/026; G01N 27/221; G01N 27/4145; G01N 27/447; G01N 27/72; G01N 33/0063; G01N 2021/4752; G01N 21/47; G01N 27/16; G01N 33/0004; G01N 33/0014; G01N 21/53; G01N 15/00; G01N 15/06; G01N 15/075; G01N 2015/0038; G01N 2015/1486; G01N 22/00; G01N 27/124; G01N 27/66; G01N 15/0205; G01N 15/0211; G01N 15/14; G01N 15/1429; G01N 15/1459; G01N 2015/0238; G01N 2015/1447; G01N 2015/1493; G01N 21/85; G01N 25/22; G01N 27/07; G01N 27/12; G01N 27/409; G01N 27/623; G01N 33/0016; G01N 33/007; G01N 33/02; G01B 11/026; G01B 11/26; G01B 15/00
See application file for complete search history.

(56)                    References Cited

U.S. PATENT DOCUMENTS

2012/0212346  A1 *   8/2012   Conforti  ................ G08B 29/26
                                                           340/628
2018/0366570  A1     12/2018  Knox et al.

FOREIGN PATENT DOCUMENTS

EP             4273826  A1 *  11/2023   ............. G08B 17/10
JP           2019096270  A   *   6/2019
WO       WO-2018027104  A1 *   2/2018   ........... G08B 17/107

* cited by examiner

100

Control System 126

| Network Switch 128 | FA System 130 | Command Center 132 |

150

Building Area 140

116

114

102

104

Beam Transmitter 108

104  104

Beam Transmitter 108

Beam Transmitter 108

Infrared (IR) Beam

Ultra-Violet (UV) Beam

Laser Beam

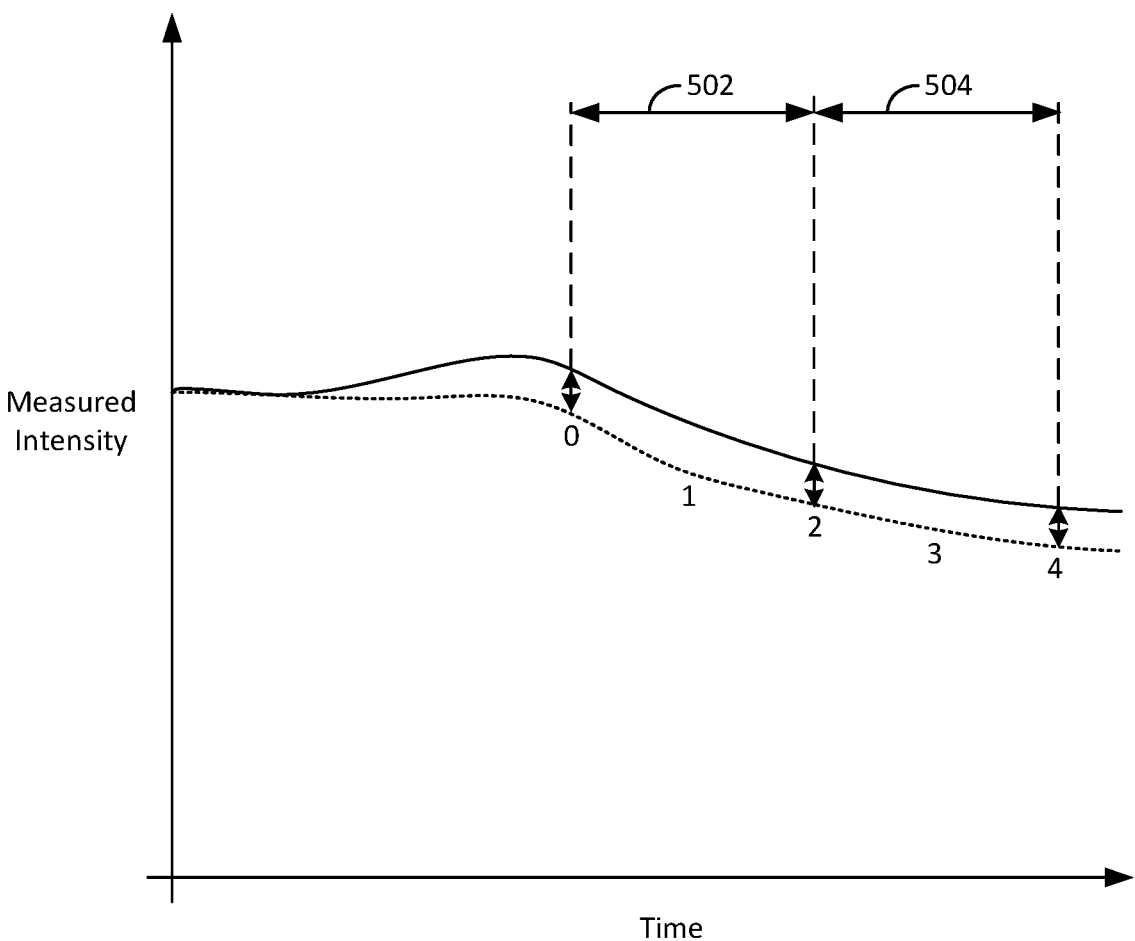
FIG. 5

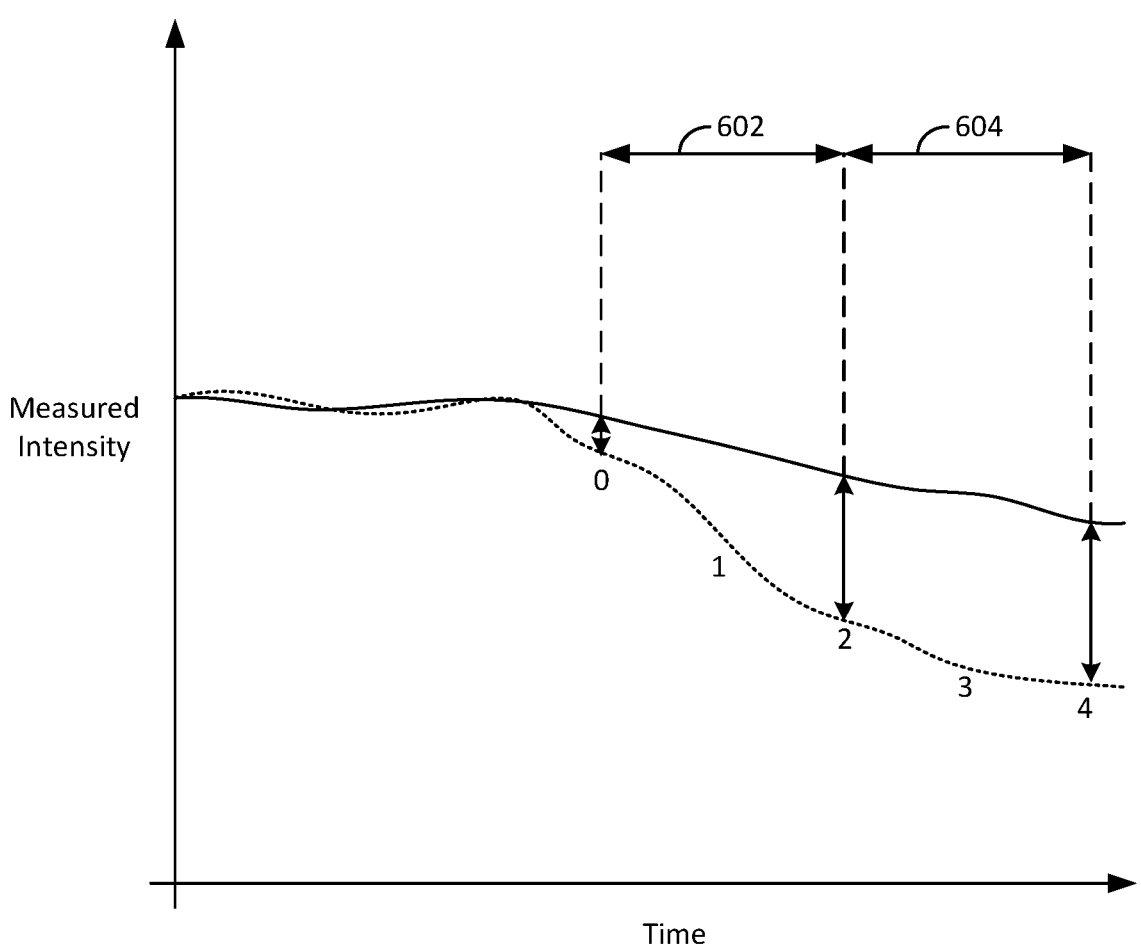
FIG. 6

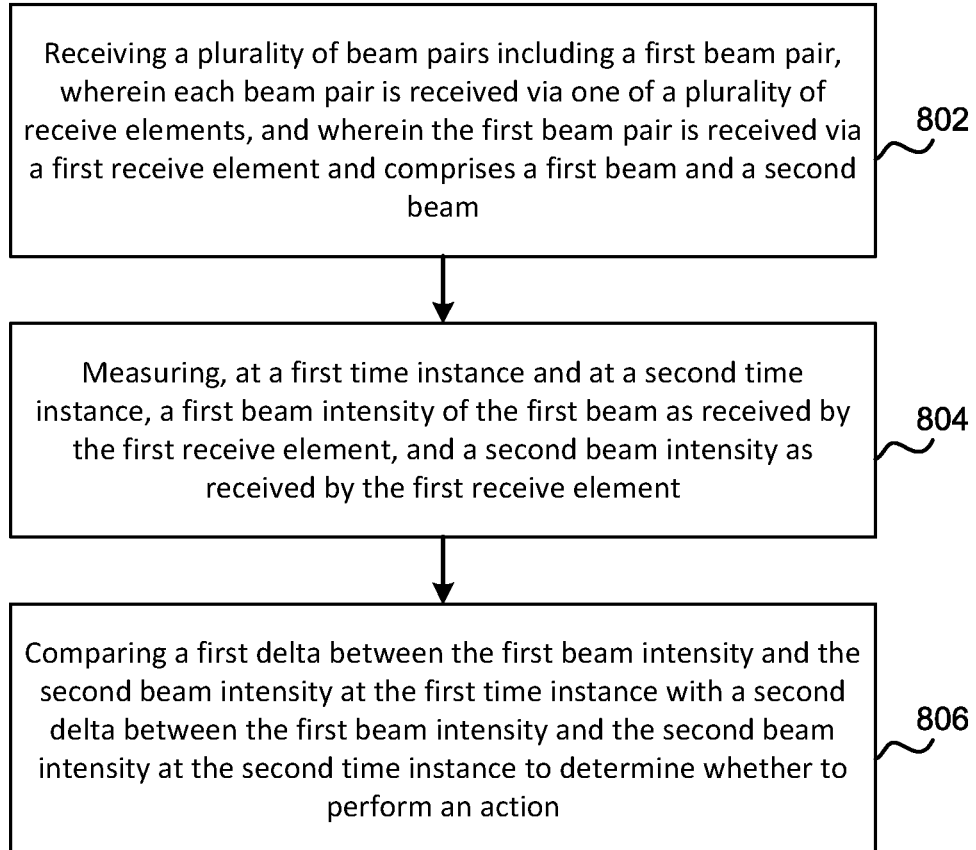

800

Receiving a plurality of beam pairs including a first beam pair, wherein each beam pair is received via one of a plurality of receive elements, and wherein the first beam pair is received via a first receive element and comprises a first beam and a second beam — 802

Measuring, at a first time instance and at a second time instance, a first beam intensity of the first beam as received by the first receive element, and a second beam intensity as received by the first receive element — 804

Comparing a first delta between the first beam intensity and the second beam intensity at the first time instance with a second delta between the first beam intensity and the second beam intensity at the second time instance to determine whether to perform an action — 806

Figures 9, 10:
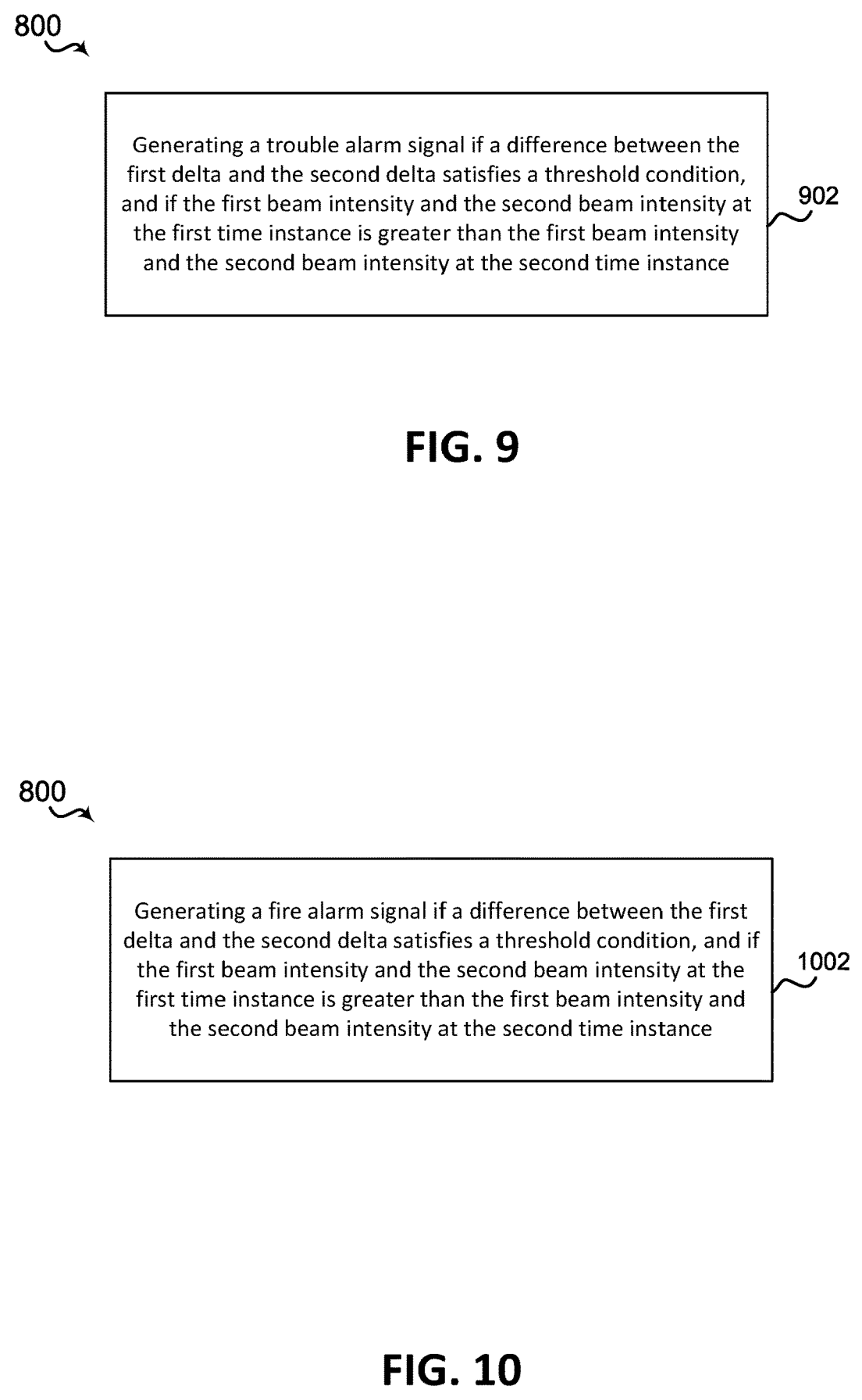

Generating a trouble alarm signal if a difference between the first delta and the second delta satisfies a threshold condition, and if the first beam intensity and the second beam intensity at the first time instance is greater than the first beam intensity and the second beam intensity at the second time instance

Generating a fire alarm signal if a difference between the first delta and the second delta satisfies a threshold condition, and if the first beam intensity and the second beam intensity at the first time instance is greater than the first beam intensity and the second beam intensity at the second time instance

Receiving, via a humidity sensor, an indication of an ambient humidity outside of the beam receiver — 1102

Activating a heating element if the ambient humidity satisfies a threshold condition — 1104

Deactivating or refraining from activating the heating element if the ambient humidity does not satisfy the threshold condition — 1106

1300

DUAL-LENS SMOKE DETECTION SYSTEM

TECHNICAL FIELD

The present disclosure generally relates to beam-detection fire alarm systems. More particularly, the present disclosure relates to a dual-lens smoke detector system.

BACKGROUND

Fire alarm systems are often installed within a premises such as commercial, residential, or governmental buildings. Examples of these buildings include offices, hospitals, warehouses, schools or universities, shopping malls, government offices, and casinos. The fire alarm systems typically include fire alarm devices deployed within the buildings that are directly wired to a fire alarm panel, although wireless systems are becoming more common. The fire alarm devices include alarm notification devices such as sirens and strobe lights that alert occupants of the building of potential fire conditions, and fire sensor devices that detect indications of fire such as heat, smoke, flame, and carbon monoxide, in examples.

For open-area smoke detection, a beam detector system may be used, wherein the system may sense smoke by projecting a light beam from a transceiver unit across the protected area to a reflector that returns the light signal back to the transceiver unit. Smoke entering the beam path will decrease the light signal causing an alarm. However, such a beam detection system requires a significant number transceiver units because of range limitations associated with systems that require both transmission of light and transmission of a reflection of that light. Moreover, coving a large area with such a system requires a significant quantity of transceiver and reflector units in order to maximize the size of a smoke detection area.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example aspect includes a method of smoke detection at a beam receiver, comprising receiving a plurality of beam pairs including a first beam pair, wherein each beam pair is received via one of a plurality of receive elements, and wherein the first beam pair is received via a first receive element and comprises a first beam and a second beam. The method further includes measuring, at a first time instance and at a second time instance, a first beam intensity of the first beam as received by the first receive element, and a second beam intensity as received by the first receive element. Additionally, the method further includes comparing a first delta between the first beam intensity and the second beam intensity at the first time instance with a second delta between the first beam intensity and the second beam intensity at the second time instance to determine whether to perform an action.

Another example aspect includes an apparatus for smoke detection at a beam receiver, comprising one or more memories and one or more processors coupled with the one or more memories. The one or more processors are configured to receive a plurality of beam pairs including a first beam pair, wherein each beam pair is received via one of a plurality of receive elements, and wherein the first beam pair is received via a first receive element and comprises a first beam and a second beam. The one or more processors are further configured to measure, at a first time instance and at a second time instance, a first beam intensity of the first beam as received by the first receive element, and a second beam intensity as received by the first receive element. Additionally, the one or more processors are further configured to compare a first delta between the first beam intensity and the second beam intensity at the first time instance with a second delta between the first beam intensity and the second beam intensity at the second time instance to determine whether to perform an action.

Another example aspect includes an apparatus for smoke detection at a beam receiver, comprising means for receiving a plurality of beam pairs including a first beam pair, wherein each beam pair is received via one of a plurality of receive elements, and wherein the first beam pair is received via a first receive element and comprises a first beam and a second beam. The apparatus further includes means for measuring, at a first time instance and at a second time instance, a first beam intensity of the first beam as received by the first receive element, and a second beam intensity as received by the first receive element. Additionally, the apparatus further includes means for comparing a first delta between the first beam intensity and the second beam intensity at the first time instance with a second delta between the first beam intensity and the second beam intensity at the second time instance to determine whether to perform an action.

Another example aspect includes a computer-readable medium having instructions stored thereon of smoke detection at a beam receiver, wherein the instructions are executable by a processor to receive a plurality of beam pairs including a first beam pair, wherein each beam pair is received via one of a plurality of receive elements, and wherein the first beam pair is received via a first receive element and comprises a first beam and a second beam. The instructions are further executable to measure, at a first time instance and at a second time instance, a first beam intensity of the first beam as received by the first receive element, and a second beam intensity as received by the first receive element. Additionally, the instructions are further executable to compare a first delta between the first beam intensity and the second beam intensity at the first time instance with a second delta between the first beam intensity and the second beam intensity at the second time instance to determine whether to perform an action.

In some aspects, the techniques described herein relate to an apparatus for smoke detection at a beam transmitter. In some examples, the apparatus includes one or more memories, individually or in combination, having instructions and one or more processors, individually or in combination, configured to execute the instructions. In some examples, the one or more processors are configured to radiate, via a first emitter a first beam. In some examples, the one or more processors are configured to radiate, via a second emitter, a second beam, wherein the first beam and the second beam are both radiated in a first direction toward a beam receiver.

Another example aspect includes a method for smoke detection at a beam transmitter. In some examples, the method includes radiating, via a first emitter, a first beam. In some examples, the method includes radiating, via a second emitter, a second beam, wherein the first beam and the second beam are both radiated in a first direction toward a beam receiver.

Another example aspect includes an apparatus for smoke detection. In some examples, the apparatus includes means for radiating a first beam. In some examples, the apparatus includes means for radiating a second beam, wherein the first beam and the second beam are both radiated in a first direction toward a beam receiver. Here, the means for radiating the first beam may include a first emitter, and the means for radiating the second beam may include a second emitter.

Another example aspect includes a computer-readable medium having instructions stored thereon of smoke detection at a beam transmitter, wherein the instructions are executable by a processor. In some examples, the instructions are executable to radiate, via a first emitter, a first beam. In some examples, the instructions are executable to radiate, via a second emitter, a second beam, wherein the first beam and the second beam are both radiated in a first direction toward a beam receiver.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, wherein dashed lines may indicate optional elements, and in which:

FIG. 5 is a line graph of measured intensity versus time illustrating an example of a scenario when a beam receiver will trigger a trouble alarm.

FIG. 6 is a line graph of measured intensity versus time illustrating an example of a scenario when a beam receiver will trigger a fire alarm.

FIG. 8 is a flowchart of an example of a method of smoke detection at a beam receiver.

FIG. 9 is a flowchart of another aspect of the method of smoke detection at the beam receiver.

FIG. 10 is a flowchart of another aspect of the method of smoke detection at the beam receiver.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Beam-type smoke detectors may measure the presence and concentration of smoke across an open area using a laser/lightbeam and reflector. Aspects described herein relate to a smoke detector/fire alarm system implemented as a single beam receiver, and multiple beam transmitter each configured to radiate beams to the same beam receiver. Accordingly, the single receiving unit may be configured to receive a plurality of beams.

In certain aspects, the single receiving unit may measure an intensity of the each of the multiple received beams to determine whether smoke is diffusing the one or more of the received beams. In one example, each beam transmitter may transmit an ultra-violet (UV) beam and an infrared (IR) beam to the beam receiver. In such an example, the beam receiver may receive multiple beams from each of the multiple beam transmitters. Here, the beam receiver may measure an intensity of a UV beam and an IR beam from each beam transmitter and compare a UV beam intensity and an IR beam intensity at a given time. Smoke particles passing through the beam pair will typically reduce the UV intensity as measured at the beam receiver relatively more than the IR intensity. In contrast, dust or other object interference will generally affect both the UV and IR intensities equally. Thus, a beam receiver may be configured to distinguish between smoke vs dust or other object interference, thereby reducing false alarms.

In certain aspects, the beam receiver may be configured to trigger a trouble alarm or a fire alarm based on measurements of a UV bema and an IR beam from a given beam transmitter. A trouble alarm may indicate a potential fire, while the fire alarm may indicate a relatively high certainty of a fire with a building area.

In certain aspects, the beam receiver may be configured to interface with an external control system to provide alarms and other data. In one example, the beam receiver is configured to operate agnostically via a power over ethernet (PoE) network switch with any external control system (e.g., third party control systems, Simplex fire alarm control systems, etc.).

Figure 1:
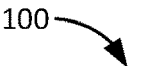
FIG. 1 is a top-view block diagram conceptually illustrating an example beam-type smoke detection system.

FIG. 1 is a block diagram conceptually illustrating an example beam-type smoke detection system 100. A beam receiver 102 and multiple corresponding beam transmitters 108 may be installed within a building area 140 so that there is a clear line-of-sight between the beam receiver 102 and each of the multiple beam transmitters 108. The beam receiver 102 may include multiple beam receiving elements 104 configured to receive wavelengths radiated by corresponding beam transmitters 108. One or more of the beam transmitters 108 may radiate a UV beam and an IR beam in a particular direction toward a corresponding beam receiving element 104.

The beam receiver may also include one or more processors 114 configured to, individually or in combination, measure an intensity of received UV and IR beams. In some examples, the one or more processors 114 may periodically determine an intensity difference (e.g., delta) between a UV beam and an IR beam received from the same beam transmitter and compare previously determined deltas with newly determined deltas. Based on the measured beam intensity and determined UV and IR beam deltas (as described in more detail below in reference to FIGS. 5 and 6), the one or more processors 114 may trigger an alarm. As noted above, a significant disparity in beam intensity between the UV and IR beams may indicate the presence of smoke.

The beam receiver may include a network interface 116 configured to communicate with an external control system 126 via wired local area network (LAN) or a wireless local area network (WLAN) via an internet/intranet 150 connection. In one example, the network interface 116 may include a PoE network switch communicatively coupled to a core network switch rack 128 via which the beam receiver 102 communicates with a fire alarm system 130 and/or a command center 132 (e.g., a closed-circuit television (CCTV) system. The core network switch rack 128 may communicate with the fire alarm system 130 and/or a command center 132 via an application programming interface (API) to enable software agnostic interoperability between the beam receiver 102 and the control system 126. The control system 126 may be implemented as a monitoring center integrated with video monitoring, a Simplex fire alarm system, a CCTV system, and/or any suitable third-party fire alarm system.

Examples of a Beam Pair Smoke Detection System

Figure 2:
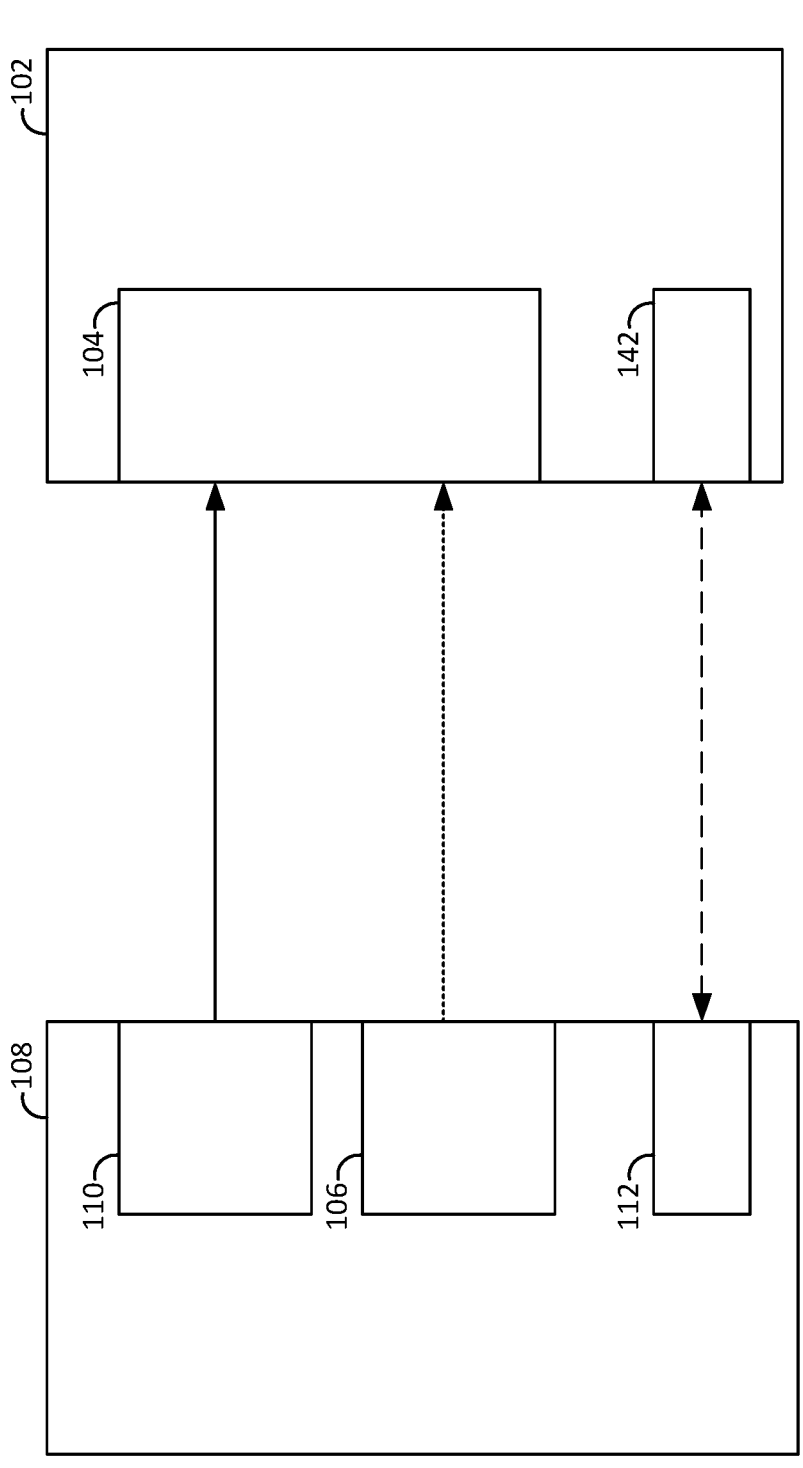
FIG. 2 is a side-view block diagram conceptually illustrating an example beam transmitter and beam receiver.

FIG. 2 is a block diagram conceptually illustrating an example beam transmitter 108 and beam receiver 102. Here, the beam transmitter 108 includes a UV beam transmitter 110, an IR beam transmitter 106, and a laser beam transmitter/receiver 112/142. Thus, the beam transmitter 108 may be referred to herein as a dual-lens transmitter due to the beam pair it may transmit via individual lenses. The beam receiver 102 includes a beam receiving element 104 and a laser beam transmitter/receiver 112/142. The beam receiving element 104 is configured to receive and measure UV and IR beams transmitted by the beam transmitter 108.

Using both IR and UV beams in a beam-type smoke detection system may reduce false alarm triggering because the UV beam exhibits different intensity profiles (from the perspective of the beam receiver 102). UV beam intensity, as measured by the beam receiver 102, may change minimally when dust, animals/insects, or other objects obscure the UV path. In contrast, smoke particles (which are typically much finer than dust particles) reduce the UV light intensity relatively more than dust. The combination of UV and IR beams may reduce false alarms relative to a single-beam beam-transmitter by using a model that measures intensity of both the UV and IR beams and compares deltas between UV measured intensity and IR measured intensity at different time instances. For example, smoke causes a significantly greater reduction in UV intensity relative to IR intensity. Thus, a significant delta between the measured UV intensity and the measured IR intensity may indicate smoke, whereas dust would typically cause a minimum delta the measured UV intensity and the measured IR intensity.

The beam transmitter 108 and the beam receiver 102 may be oriented such that the UV beam transmitter 110 and the IR beam transmitter 106 are directed to the beam receiving element 104 in order to effectively measure incident UV and IR wavelengths. In some examples, each of the beam transmitter 108 and the beam receiver 102 may include a laser transmitter and/or laser receiver configured to ensure precise orientation. For example, the beam transmitter 108 may include a laser transmitter 112 and the beam receiver 102 may include a laser receiver 142. During installation of both, a user may position the transmitter and receiver such that the laser receiver 142 is capable of measuring a light intensity of an incident laser beam that is greater than a threshold value. In this example, the beam receiver 102 may indicate proper alignment with the beam transmitter 108 via a visual indicator (e.g., an LED light) and/or an audible indicator (e.g., a beeping/buzzing sound).

Once proper alignment of the beam transmitter 108 and the beam receiver 102 is achieved, the user may lock the respective positions of the transmitter and receiver using any suitable fastening mechanism (e.g., locking Allen key, hex wrench, etc.). In some examples, one or more of the beam transmitter 108 and the beam receiver 102 may be mounted to a wall via a wall mounting adaptor, to a corner of two walls via a corner mounting adapter, or to a ceiling using a ceiling mounting adapter. In such an example, the fastening mechanism may secure the position of the transmitter/receiver to the mounting adapter.

Figure 3:
FIG. 3 is a block diagram illustrating an example side-view of a beam receiver, additional top views of the beam receiver, and a bottom-view of the beam receiver.

FIG. 3 is a block diagram illustrating example beam receiving element 104 configurations of the beam receiver 102. Although four configurations are shown, any suitable combination of the configurations and/or number of beam receiving elements 104 may be used on a beam receiving element 104.

A first configuration 302 is illustrated as a top-view block diagram of a beam receiver 102. Here, the beam receiver 102 includes three beam receiving elements 104, each directed approximately 45° away from another of the elements. In this configuration, the beam receiver 102 may receive three beam pairs (e.g., a UV beam and an IR beam) from three different beam transmitters 108, thereby providing 180° of coverage 304. The first configuration 302 may be optimal for a wall-mounted or concave-corner mounted installation of a beam receiver 102.

A second configuration 306 is illustrated as a top-view block diagram of a beam receiver 102. Here, the beam receiver 102 includes four beam receiving elements 104, each directed approximately 90° away from another of the elements. In this configuration, the beam receiver 102 may receive four beam pairs from four different beam transmitters 108, thereby providing 360° of coverage 308. The second configuration 306 may be optimal for a ceiling-mounted installation (e.g., in the middle of a building area 140) of a beam receiver 102.

A third configuration 310 is illustrated as a top-view block diagram of a beam receiver 102. Here, the beam receiver 102 includes three beam receiving elements 104, each directed approximately 90° away from another of the elements. In this configuration, the beam receiver 102 may receive three beam pairs from three different beam transmitters 108, thereby providing 270° of coverage 312. The third configuration 310 may be optimal for a convex-corner mounted installation of a beam receiver 102.

A fourth configuration 314 is illustrated as a side-view block diagram of a beam receiver 102 located on a ceiling of the building area 140. Here, the beam receiver 102 includes at least one beam receiving element 104 directed to a floor surface (e.g., a floor of the building area 140). In this configuration, the beam receiver 102 may receive a beam pair from a beam transmitter 108 located on the floor, thereby providing coverage 316 between the floor and the ceiling.

The configurations described above are not limiting, as any suitable configuration may be used based on installation preferences, user preferences, building area characteristics (e.g., size, dimensions), etc. Accordingly, a single beam receiver 102 may include one or more beam receiving elements 104 each configured to receive a beam pair from at least one corresponding beam transmitter 108.

In some examples, the beam receiver 102 may include one or more light-emitting diodes (LEDs) 330 configured to indicate a status of the beam receiver. For example, the status of the beam receiver may include one or more of a trouble alarm, a fire alarm, a programming mode, a search mode, or a lock between the first receive element and a first beam transmitter. In certain aspects, a laser guided position may be indicated by one or more of the LEDs.

Figure 4:
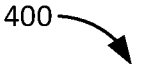
FIG. 4 is a top-view block diagram illustrating an example installation of a beam-type detector system including a beam receiver and multiple beam transmitters within a building area.

FIG. 4 is a block diagram illustrating an example installation 400 of a beam-type detector system including a beam receiver 402 and multiple beam transmitters 108 within a building area 140. Although the building area 140 is illustrated as a square shaped region, the building area 140 may be defined by any shape. The beam receiver may be installed on a ceiling or other structural element of the building area 140. Here, the beam receiver 402 includes eight beam receiving elements 404 each facing a pre-determined direction and configured to receive a beam pair transmitted by a corresponding beam transmitter 108.

As illustrated, there is a 1-to-1 correspondence between beam receiving elements 404 and beam transmitters 108, thereby providing eight paths 410 for radiated beam pairs between the beam receiver 402 and the eight beam transmitters 108. The beam receiver 402 may measure the incident beam pairs at each beam receiving element. It should be noted that other correspondence ratios may be used. For example, a single beam receiving element 404 may be configured to receive a beam pair from multiple beam transmitters 108 in different locations.

The beam receiver 402 may be configured to trigger one or more alarms in response to detected smoke or to a possible detection of smoke. In one example, the beam receiver may trigger a fire alarm if a beam pair measurement indicates that smoke is diffusing or otherwise interrupting the beam pair between the beam receiver 402 and a transmitter of the beam pair. In another example, a trouble alarm may be triggered if a beam pair measurement indicates that the beam pair is experiencing diffusion or another interruption that doesn't match the diffusion profile of smoke.

Examples of a Multi-Alarm Smoke Detection System

FIG. 5 is a line graph illustrating an example of a scenario 500 when a beam receiver (e.g., beam receiver 102/402) will trigger a trouble alarm. The graph indicates a measured intensity of each of an IR beam (shown as a solid line) and a UV beam (shown as a dashed line) transmitted from a beam transmitter (e.g., beam transmitter 108) and incident on the beam receiver 102. Instances in time are illustrated as 0, 1, 2, 3, and 4. The units of these time instances may be user configurable at the beam receiver, and may include seconds (e.g., 1 second, 5 seconds, etc.).

Smoke particles passing through the beam pair will typically reduce the UV intensity as measured at the beam receiver 12 relatively more than the IR intensity. However, dust or other object interference will generally affect both the UV and IR intensities equally.

At a first time instance (0), the beam receiver 102 may determine that a measured intensity of the UV and IR beams incident to a beam receiving element (e.g., beam receiving element 104/404) begins to decline. Upon this determination, the beam receiver 102 may initiate a timer or a counter at the first time instance. The timer may begin a countdown of a time window, the end of which may trigger the trouble alarm. The counter may count a threshold number of time instances following the first time instance, whereupon meeting the threshold number of time instances may trigger the trouble alarm.

If the measured intensity of the UV and IR beams continues to decline for a preconfigured number of time instances (e.g., 2 time instances, (1) and (2)), and the rate of decline for each beam is substantially the same rate, then the beam receiver 102 may determine that the rate of decline is not indicative of a smoke interruption or diffusion of the beams, and the beam receiver 102 may trigger a trouble alarm upon determining the measured intensity of the beam pair received at time instance (2). In this example, the timer would be a countdown of 2 time instances, and the counter threshold would be 2 time instances.

Alternatively, if the measured intensity of the UV and IR beams continues to decline for the preconfigured number of time instances, and the rate of decline for each beam is substantially the same rate, then instead of triggering the trouble alarm, the beam receiver 102 may continue to monitor and measure the received UV and IR intensity for another preconfigured number of time instances (e.g., 2 time instances, (3) and (4)). If the measured intensity of the beam pair continues to fall for the additional number of time instances and the rate of declining intensity of each beam remains substantially the same, then the beam receiver 102 may trigger the trouble alarm. Thus, in this example, the first preconfigured number of time instances (e.g., (1) and (2)) may serve as a pre-alarm confirmation 502 to prevent a false trouble alarm. The next preconfigured number of time instances may serve as a trouble alarm confirmation 504.

In another alternative, the beam receiver 102 may be configured to trigger the trouble alarm if the measured intensity of the UV and IR beams decline at substantially the same rate, and a measured intensity of at least one of the UV and IR beams falls to a pre-configured threshold value. For example, the beam receiver 102 may measure intensity of each beam using any suitable measuring unit (e.g., lumens per unit area, watts per unit area, etc.). Once the measured intensity of at least one of the beams falls below the threshold unit value, the beam receiver 102 triggers the trouble alarm. For example, the threshold unit value may equal the measured intensity of the UV beam at time instance (4).

FIG. 6 is a line graph illustrating an example of a scenario 600 when a beam receiver (e.g., beam receiver 102/402) will trigger a fire alarm. The graph indicates a measured intensity of each of an IR beam (shown as a solid line) and a UV beam (shown as a dashed line) transmitted from a beam transmitter (e.g., beam transmitter 108) and incident on the beam receiver 102. Instances in time are illustrated as 0, 1, 2, 3, and 4. The units of these time instances may be user configurable at the beam receiver, and may include seconds (e.g., 1 second, 5 seconds, etc.). In this example, because smoke has a greater diffusion effect on UV than IR, the beam receiver 102 may trigger the fire alarm based on disparity of a rate at which the measured intensity of each beam is declining.

At a first time instance (0), the beam receiver 102 may determine that a measured intensity of the UV and IR beams incident to a beam receiving element (e.g., beam receiving element 104/404) begins to decline. Upon this determination, the beam receiver 102 may initiate the timer or the counter at the first time instance, as described above.

The beam receiver 102 may continue to monitor the UV and IR beams. If the measured intensity of the UV and IR beams continues to decline for a preconfigured number of time instances (e.g., 2 time instances, (1) and (2)), and the rate of decline of the UV beam is greater than that of the IR beam (e.g., the measured intensity of the UV beam is falling faster than the intensity of the IR beam), then the beam receiver 102 may determine that the decline of beam intensity is indicative of a smoke interruption or diffusion of the beams. The beam receiver 102 may trigger a fire alarm upon determining the measured intensity of the beam pair received at time instance (2). In this example, the timer would be a countdown of 2 time instances, and the counter threshold would be 2 time instances.

Alternatively, if the measured intensity of the UV and IR beams continues to decline for the preconfigured number of time instances, and the measured intensity of the UV beam is continues to fall faster than the measured intensity of the IR beam, then instead of triggering a fire alarm, the beam receiver 102 may continue to monitor and measure the received UV and IR intensity for another preconfigured number of time instances (e.g., 2 time instances, (3) and (4)). If the measured intensity of the beam pair continues to fall for the additional number of time instances and the rate of UV intensity decline remains greater than the rate of the IR intensity decline, then the beam receiver 102 may trigger the fire alarm. Thus, in this example, the first preconfigured number of time instances (e.g., (1) and (2)) may serve as a pre-alarm confirmation 602 to prevent a false fire alarm. The next preconfigured number of time instances may serve as a fire alarm confirmation 604.

In another alternative, the beam receiver 102 may be configured to trigger the fire alarm if the measured intensity of the UV beam declines at a faster rate than the IR beam and a measured intensity of at least one of the UV and IR beams falls to a pre-configured threshold value. Once the measured intensity of at least one of the beams falls below the threshold unit value, the beam receiver 102 triggers the trouble alarm. For example, the threshold unit value may equal the measured intensity of the UV beam at time instance (4).

Figure 7:
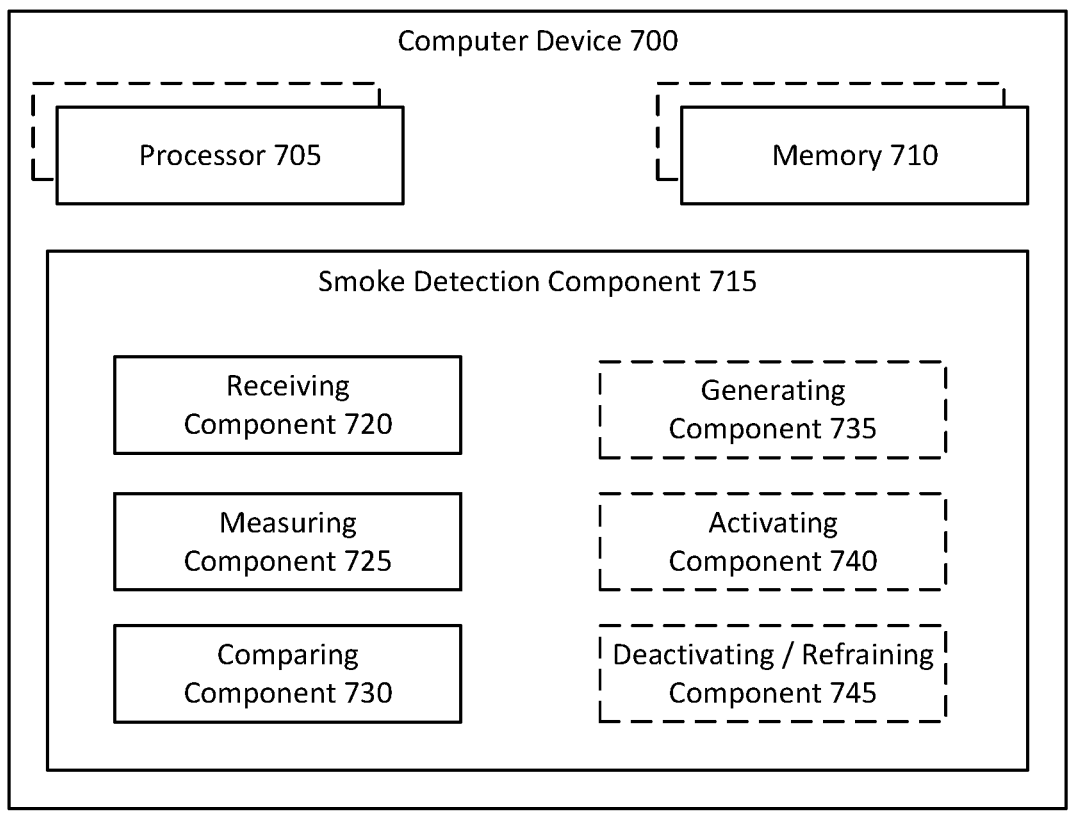
FIG. 7 is a block diagram of an example of a computer device having components configured to perform a method of smoke detection at a beam receiver.

Referring to FIG. 7 and FIG. 8, in operation, computer device 700 may perform a method 800 of smoke detection at a beam receiver, such as via execution of a smoke detection component 715 by one or more processors 705 and/or one or more memories 710. In certain aspects, the computer device 700 may be implemented as a beam receiver (e.g., beam receiver 102/402).

At block 802, the method 800 includes receiving a plurality of beam pairs including a first beam pair, wherein each beam pair is received via one of a plurality of receive elements, and wherein the first beam pair is received via a first receive element and comprises a first beam and a second beam. For example, in an aspect, computer device 700, one or more processors 705, one or more memories 710, smoke detection component 715, and/or receiving component 720 may be configured to or may comprise means for receiving a plurality of beam pairs including a first beam pair, wherein each beam pair is received via one of a plurality of receive elements, and wherein the first beam pair is received via a first receive element and comprises a first beam and a second beam.

For example, the receiving at block 802 may include receiving multiple beam pairs from multiple transmitters, where each transmitter transmits a corresponding beam pair to the receiving component 720. Here, a beam pair may include an IR beam and a UV beam, and the receiving component 720 may be configured to measure an intensity of the UV beam and IR beam incident to the receiving component 720.

Further, for example, the receiving at block 802 may be performed by the receiving component 720 which may be configured as a complementary metal-oxide semiconductor (CMOS) sensor or a charge-coupled device (CCD) sensor.

At block 804, the method 800 includes measuring, at a first time instance and at a second time instance, a first beam intensity of the first beam as received by the first receive element, and a second beam intensity as received by the first receive element. For example, in an aspect, computer device 700, one or more processors 705, one or more memories 710, smoke detection component 715, and/or measuring component 725 may be configured to or may comprise means for measuring, at a first time instance and at a second time instance, a first beam intensity of the first beam as received by the first receive element, and a second beam intensity as received by the first receive element.

For example, the measuring at block 804 may include measuring each beam of a beam pair received at the receiving component 720. Here, the measuring component 725 may measure each beam to determine an intensity of each beam. The measuring component 725 may continually measure each beam at successive times to help determine if smoke, dust, or other matter is interfering (e.g., diffracting/scattering) with each beam. For example, if the intensity of each beam begins to drop over a period of time, then depending on the beam pair profile, the computer device 700 may trigger a trouble alert or a fire alert.

Further, for example, the measuring at block 804 may be performed by measuring a light or wavelength intensity of both an IR and a UV beam incident on the receiving component 720.

At block 806, the method 800 includes comparing a first delta between the first beam intensity and the second beam intensity at the first time instance with a second delta between the first beam intensity and the second beam intensity at the second time instance to determine whether to perform an action. For example, in an aspect, computer device 700, one or more processors 705, one or more memories 710, smoke detection component 715, and/or comparing component 730 may be configured to or may comprise means for comparing a first delta between the first beam intensity and the second beam intensity at the first time instance with a second delta between the first beam intensity and the second beam intensity at the second time instance to determine whether to perform an action.

For example, the comparing at block 806 may compare measurements of each beam. Using FIG. 5 as an example, the measuring at block 804 may measure an intensity of each of the UV beam and the IR beam at time instances (0), (1), (2), (3), and (4). The comparing block 806 may compare the measured intensity of the IR beam with the measured intensity of the UV beam, where the intensity of both beams was measured at time instances (0), (2), and (4). Based on the comparison, the computer device 700 may calculate a delta between the IR beam intensity and the UV beam intensity at a given time. Over a timeline, these deltas may indicate an interference profile. For example, the UV beam and the IR beam diminishing in intensity over time at a substantially equal rate (e.g., as illustrated in FIG. 5) may indicate dust or another object is interfering with the line-of-sight between a beam transmitter (e.g., beam transmitter 108) and the computer device 700. In another example, the UV beam and the IR beam diminishing in intensity over time at in asymmetric or disproportionate rate (e.g., as illustrated in FIG. 6) may indicate smoke is interfering with the line-of-sight between the beam transmitter and the computer device 700.

In an alternative or additional aspect, the action may be generating a trouble alarm signal, or generating a fire alarm signal.

Referring to FIG. 9, in an alternative or additional aspect wherein the action is generating a trouble alarm signal, at block 902 the method 800 further includes generating a trouble alarm signal if a difference between the first delta and the second delta satisfies a threshold condition, and if the first beam intensity and the second beam intensity at the first time instance is greater than the first beam intensity and the second beam intensity at the second time instance. For example, in an aspect, computer device 700, one or more processors 705, one or more memories 710, smoke detection component 715, and/or generating component 735 may be configured to or may comprise means for generating a trouble alarm signal if a difference between the first delta and the second delta satisfies a threshold condition, and if the first beam intensity and the second beam intensity at the first time instance is greater than the first beam intensity and the second beam intensity at the second time instance.

For example, the generating at block 902 may be based on monitoring the received UV beam and IR beam intensities over a period of time. As illustrated in the example of FIG. 5, a first delta between the intensity of the IR beam and intensity of the UV beam at time instance (0) is similar to a second delta between the intensity of the IR beam and intensity of the UV beam at time instance (2). Thus, the threshold condition may require that a difference between the first delta and the second delta not be more than a particular integer value or percentage. In the example of FIG. 5, the first delta and the second delta are substantially similar, and thus, the threshold condition may be met. Moreover, as shown in FIG. 5, the UV beam intensity at time instance (0) is greater than the UV beam intensity at time instance (2), and the IR beam intensity at time instance (0) is greater than the IR beam intensity at second time instance (2). Thus, the measured intensity of each beam is declining over time. As such, the generating component 735 may trigger a trouble alarm signal to indicate that there may be an object or matter blocking the line-of-sight between the computer device 700 and the beam transmitter. The trouble alarm signal may also indicate that the blocking object is likely not smoke.

Referring to FIG. 10, in an alternative or additional aspect wherein the action is generating a fire alarm signal, at block 1002 the method 800 further includes generating a fire alarm signal if a difference between the first delta and the second delta satisfies a threshold condition, and if the first beam intensity and the second beam intensity at the first time instance is greater than the first beam intensity and the second beam intensity at the second time instance. For example, in an aspect, computer device 700, one or more processors 705, one or more memories 710, smoke detection component 715, and/or generating component 735 may be configured to or may comprise means for generating a fire alarm signal if a difference between the first delta and the second delta satisfies a threshold condition, and if the first beam intensity and the second beam intensity at the first time instance is greater than the first beam intensity and the second beam intensity at the second time instance.

For example, the generating at block 1002 may be based on monitoring the received UV beam and IR beam intensities over a period of time. As illustrated in the example of FIG. 6, a first delta between the intensity of the IR beam and intensity of the UV beam at time instance (0) is relatively small compared to a second delta between the intensity of the IR beam and intensity of the UV beam at time instance (2). Here, the threshold condition may require that a difference between the first delta and the second delta be greater than or equal to a particular integer value or percentage. In the example of FIG. 6, the first delta and the second delta are significantly disproportionate in relation to FIG. 5, and thus, the threshold condition may be met. Moreover, as shown in FIG. 6, the UV beam intensity at time instance (0) is greater than the UV beam intensity at time instance (2), and the IR beam intensity at time instance (0) is greater than the IR beam intensity at second time instance (2). Thus, the measured intensity of each beam is declining over time. As such, the generating component 735 may trigger a fire alarm signal to indicate that there may be smoke blocking the line-of-sight between the computer device 700 and the beam transmitter.

Figure 11:
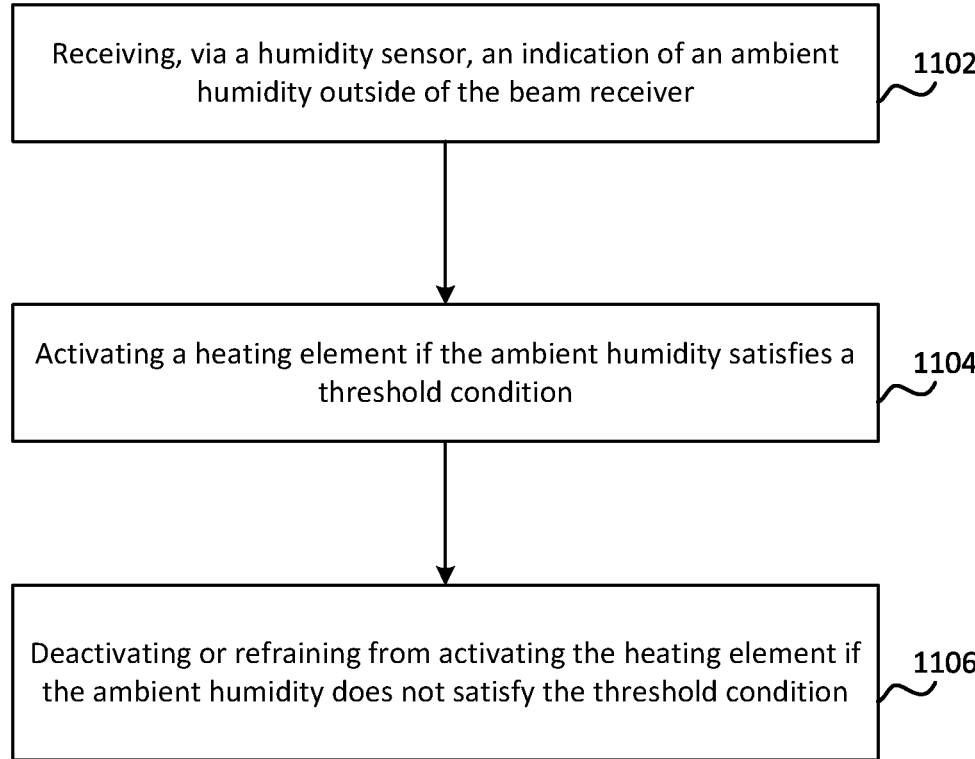
FIG. 11 is a flowchart of another aspect of the method of smoke detection at the beam receiver.

Referring to FIG. 11, in an alternative or additional aspect, at block 1102 the method 800 further includes receiving, via a humidity sensor, an indication of an ambient humidity outside of the beam receiver. For example, in an aspect, computer device 700, one or more processors 705, one or more memories 710, smoke detection component 715, and/or receiving component 720 may be configured to or may comprise means for receiving, via a humidity sensor, an indication of an ambient humidity outside of the beam receiver.

For example, the receiving at block 1102 may receive an indication of a relative humidity outside of the computer device 700. In some examples, a beam receiving element may be encased within a housing to protect the element. However, in the case of a high humidity environment, the sensor and or housing may become fogged and reduce the measured intensity of received beams. This may cause problems when measuring the beam intensities because the fog may trigger a false alarm.

Additionally, at block 1104, the method 800 further includes activating a heating element if the ambient humidity satisfies a threshold condition. For example, in an aspect, computer device 700, one or more processors 705, one or more memories 710, smoke detection component 715, and/or activating component 740 may be configured to or may comprise means for activating a heating element if the ambient humidity satisfies a threshold condition.

For example, the activating at block 1104 may be performed if the humidity sensor detects a humidity level that is equal to or greater than a threshold. Once such a threshold condition is satisfied, a heating element may be activated to heat the computer device 700 and prevent condensation from accumulating on its hardware and sensors.

Additionally, at block 1106, the method 800 further includes deactivating or refraining from activating the heating element if the ambient humidity does not satisfy the threshold condition. For example, in an aspect, computer device 700, one or more processors 705, one or more memories 710, smoke detection component 715, and/or deactivating or refraining component 745 may be configured to or may comprise means for deactivating or refraining from activating the heating element if the ambient humidity does not satisfy the threshold condition.

For example, the deactivating or refraining at block 1106 may deactivate the heating element if the atmospheric humidity drops below the threshold. Similarly, the heating element will not be activated at all if the atmospheric humidity does not pose a threat of fogging or forming condensation on the computer device 700 and/or its housing and sensors.

In certain aspects, the computer device 700 may include a housing configured to contain a plurality of receive elements, the one or more memories, and the one or more processors 705.

In certain aspects, the computer device 700 may include a humidity sensor configured to sense ambient humidity outside of the housing, and a heating element configured to generate heat internal to the housing.

In certain aspects, the computer device 700 may include a laser transmitter configured to align the first receive element with a first beam transmitter.

In certain aspects, the computer device 700 may include a laser receiver configured to receive, from a first beam transmitter, a laser beam indicative of a direction of the first beam pair.

In certain aspects, the computer device 700 may include a power over ethernet (PoE) interface configured to receive power and communicate with an external control system.

In certain aspects, the computer device 700 may include a plurality of receive elements. In some examples, each of the plurality of receive elements is implemented as a complementary metal-oxide semiconductor (CMOS) sensor or a charge-coupled device (CCD) sensor.

Figure 12:
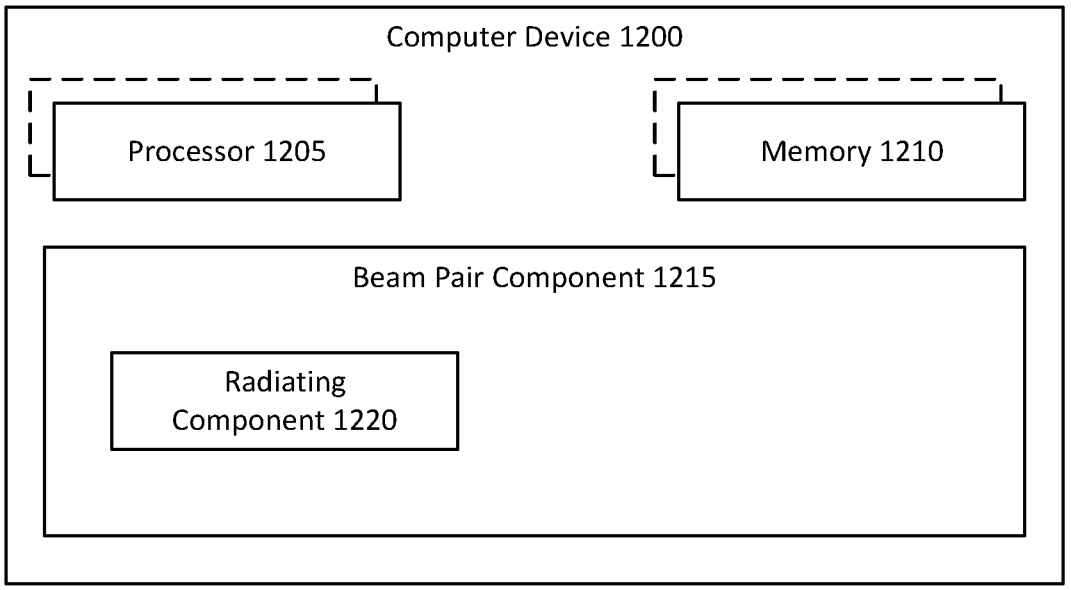
FIG. 12 is a block diagram of an example of a computer device having components configured to perform a method of smoke detection at a beam transmitter.
Figure 13:
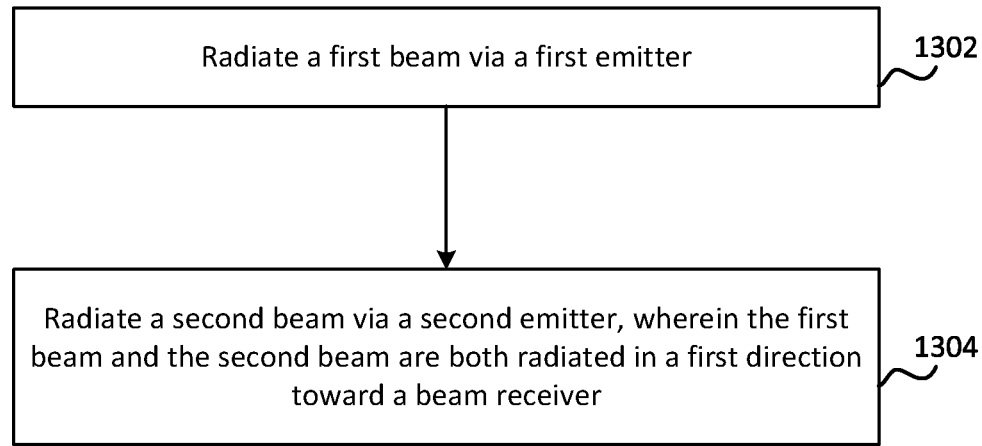
FIG. 13 is a flowchart of an example of a method of smoke detection at a beam transmitter.

Referring to FIG. 12 and FIG. 13, in operation, computer device 1200 may perform a method 1300 of smoke detection at a beam transmitter, such as via execution of a beam pair component 1215 by one or more processors 1205 and/or one or more memories 1210. In certain aspects, the computer device 1200 may be implemented as a beam transmitter (e.g., beam transmitter 108).

At block 1302, the method 1300 includes radiating a first beam via a first emitter. For example, in an aspect, computer device 1200, one or more processors 1205, one or more memories 1210, beam pair component 1215, and/or radiating component 1220 may be configured to or may comprise means for radiating a first beam via a first emitter.

For example, the radiating at block 1302 may include radiating one of a UV beam or an IR beam via a corresponding beam emitting device. The beam transmitter may be aligned with the beam receiver so that the emitted beam can be received and measured by the beam receiver.

At block 1304, the method 1300 includes radiating a second beam via a second emitter, wherein the first beam and the second beam are both radiated in a first direction toward a beam receiver. For example, in an aspect, computer device 1200, one or more processors 1205, one or more memories 1210, beam pair component 1215, and/or radiating component 1220 may be configured to or may comprise means for radiating a second beam via a second emitter, wherein the first beam and the second beam are both radiated in a first direction toward a beam receiver.

For example, the radiating at block 1304 may include radiating the other of one of a UV beam or an IR beam via a corresponding beam emitting device. The beam transmitter may be aligned with the beam receiver so that the emitted beam can be received and measured by the beam receiver. Accordingly, the computer device 1200 may radiate two different beams toward a single receiver configured to receive both beams.

In certain aspects, the computer device 1200 includes a laser transmitter configured to align the first beam and the second beam with a receiving element of the beam receiver, and/or a laser receiver configured to receive, from the beam receiver, a laser beam indicative of a facing direction of the receiving element.

In certain aspects, the computer device 1200 includes a housing configured to contain the first emitter and the second emitter.

Example Aspects

Clause 1. An apparatus for smoke detection at a beam receiver, comprising: one or more memories, individually or in combination, having instructions; and one or more processors, individually or in combination, configured to execute the instructions and cause the apparatus to: receive a plurality of beam pairs including a first beam pair, wherein each beam pair is received via one of a plurality of receive elements, and wherein the first beam pair is received via a first receive element and comprises a first beam and a second beam; measure, at a first time instance and at a second time instance, a first beam intensity of the first beam as received by the first receive element, and a second beam intensity as received by the first receive element; and compare a first delta between the first beam intensity and the second beam intensity at the first time instance with a second delta between the first beam intensity and the second beam intensity at the second time instance to determine whether to perform an action.

Clause 2. The apparatus of any preceding clause, wherein the action comprises generating a trouble alarm signal, and wherein the one or more processors are further configured to: generate the trouble alarm signal if a difference between the first delta and the second delta satisfies a threshold condition, and if the first beam intensity and the second beam intensity at the first time instance is greater than the first beam intensity and the second beam intensity at the second time instance.

Clause 3. The apparatus of any preceding clause, wherein the action comprises generating a fire alarm signal, and wherein the one or more processors are further configured to: generate the fire alarm signal if a difference between the first delta and the second delta satisfies a threshold condition, and if the first beam intensity and the second beam intensity at the first time instance is greater than the first beam intensity and the second beam intensity at the second time instance.

Clause 4. The apparatus of any preceding clause, further comprising one or more light-emitting diodes (LEDs) configured to indicate a status of the beam receiver.

Clause 5. The apparatus of any preceding clause, wherein the status of the beam receiver includes one or more of a trouble alarm, a fire alarm, a programming mode, a search mode, or a lock between the first receive element and a first beam transmitter.

Clause 6. The apparatus of any preceding clause, further comprising a housing configured to contain the plurality of receive elements, the one or more memories, and the one or more processors.

Clause 7. The apparatus of any preceding clause, further comprising: a humidity sensor configured to sense ambient humidity outside of the housing; and a heating element configured to generate heat internal to the housing.

Clause 8. The apparatus of any preceding clause, wherein the one or more processors are further configured to: receive, from the humidity sensor, an indication of the ambient humidity outside of the housing; activate the heating element if the ambient humidity satisfies a threshold condition;

and deactivate or refrain from activating the heating element if the ambient humidity does not satisfy the threshold condition.

Clause 9. The apparatus of any preceding clause, further comprising a laser transmitter configured to align the first receive element with a first beam transmitter.

Clause 10. The apparatus of any preceding clause, further comprising a laser receiver configured to receive, from a first beam transmitter, a laser beam indicative of a direction of the first beam pair.

Clause 11. The apparatus of any preceding clause, further comprising a power over ethernet (PoE) interface configured to receive power and communicate with an external control system.

Clause 12. The apparatus of any preceding clause, wherein each of the plurality of receive elements is implemented as a complementary metal-oxide semiconductor (CMOS) sensor or a charge-coupled device (CCD) sensor.

Clause 13. The apparatus of any preceding clause, wherein the first beam is an ultra-violet (UV) light beam, and wherein the second beam is an infrared (IR) beam.

Clause 14. An apparatus for smoke detection at a beam transmitter, comprising: one or more memories, individually or in combination, having instructions; and one or more processors, individually or in combination, configured to execute the instructions and cause the apparatus to: radiate, via a first emitter a first beam; and radiate, via a second emitter, a second beam, wherein the first beam and the second beam are both radiated in a first direction toward a beam receiver.

Clause 15. The apparatus of any preceding clause, further comprising one or more of: a laser transmitter configured to align the first beam and the second beam with a receiving element of the beam receiver; or a laser receiver configured to receive, from the beam receiver, a laser beam indicative of a facing direction of the receiving element.

Clause 16. The apparatus of any preceding clause, further comprising a housing configured to contain the one or more memories, the one or more processors, the first emitter, and the second emitter.

Clause 17. A method of smoke detection at a beam receiver, comprising: receiving a plurality of beam pairs including a first beam pair, wherein each beam pair is received via one of a plurality of receive elements, and wherein the first beam pair is received via a first receive element and comprises a first beam and a second beam; measuring, at a first time instance and at a second time instance, a first beam intensity of the first beam as received by the first receive element, and a second beam intensity as received by the first receive element; and comparing a first delta between the first beam intensity and the second beam intensity at the first time instance with a second delta between the first beam intensity and the second beam intensity at the second time instance to determine whether to perform an action.

Clause 18. The method of any preceding clause, further comprising: generating a trouble alarm signal if a difference between the first delta and the second delta satisfies a threshold condition, and if the first beam intensity and the second beam intensity at the first time instance is greater than the first beam intensity and the second beam intensity at the second time instance.

Clause 19. The method of any preceding clause, further comprising: generating a fire alarm signal if a difference between the first delta and the second delta satisfies a threshold condition, and if the first beam intensity and the second beam intensity at the first time instance is greater than the first beam intensity and the second beam intensity at the second time instance.

Clause 20. The method of any preceding clause, further comprising: receiving, via a humidity sensor, an indication of an ambient humidity outside of the beam receiver; activating a heating element if the ambient humidity satisfies a threshold condition; and deactivating or refraining from activating the heating element if the ambient humidity does not satisfy the threshold condition.

Additional Considerations

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

As used herein, a processor, at least one processor, and/or one or more processors, individually or in combination, configured to perform or operable for performing a plurality of actions is meant to include at least two different processors able to perform different, overlapping or non-overlapping subsets of the plurality actions, or a single processor able to perform all of the plurality of actions. In one non-limiting example of multiple processors being able to perform different ones of the plurality of actions in combination, a description of a processor, at least one processor, and/or one or more processors configured or operable to perform actions X, Y, and Z may include at least a first processor configured or operable to perform a first subset of X, Y, and Z (e.g., to perform X) and at least a second processor configured or operable to perform a second subset of X, Y, and Z (e.g., to perform Y and Z). Alternatively, a first processor, a second processor, and a third processor may be respectively configured or operable to perform a respective one of actions X, Y, and Z. It should be understood that any combination of one or more processors each may be configured or operable to perform any one or any combination of a plurality of actions.

As used herein, a memory, at least one memory, and/or one or more memories, individually or in combination, configured to store or having stored thereon instructions executable by one or more processors for performing a plurality of actions is meant to include at least two different memories able to store different, overlapping or non-overlapping subsets of the instructions for performing different, overlapping or non-overlapping subsets of the plurality actions, or a single memory able to store the instructions for performing all of the plurality of actions. In one non-limiting example of one or more memories, individually or in combination, being able to store different subsets of the instructions for performing different ones of the plurality of actions, a description of a memory, at least one memory, and/or one or more memories configured or operable to store or having stored thereon instructions for performing actions X, Y, and Z may include at least a first memory configured or operable to store or having stored thereon a first subset of instructions for performing a first subset of X, Y, and Z (e.g., instructions to perform X) and at least a second memory configured or operable to store or having stored thereon a second subset of instructions for performing a second subset of X, Y, and Z (e.g., instructions to perform Y and Z). Alternatively, a first memory, and second memory, and a third memory may be respectively configured to store or have stored thereon a respective one of a first subset of instructions for performing X, a second subset of instruction for performing Y, and a third subset of instructions for performing Z. It should be understood that any combination of one or more memories each may be configured or operable to store or have stored thereon any one or any combination of instructions executable by one or more processors to perform any one or any combination of a plurality of actions. Moreover, one or more processors may each be coupled to at least one of the one or more memories and configured or operable to execute the instructions to perform the plurality of actions. For instance, in the above non-limiting example of the different subset of instructions for performing actions X, Y, and Z, a first processor may be coupled to a first memory storing instructions for performing action X, and at least a second processor may be coupled to at least a second memory storing instructions for performing actions Y and Z, and the first processor and the second processor may, in combination, execute the respective subset of instructions to accomplish performing actions X, Y, and Z. Alternatively, three processors may access one of three different memories each storing one of instructions for performing X, Y, or Z, and the three processor may in combination execute the respective subset of instruction to accomplish performing actions X, Y, and Z. Alternatively, a single processor may execute the instructions stored on a single memory, or distributed across multiple memories, to accomplish performing actions X, Y, and Z.

What is claimed is:

1. An apparatus for smoke detection at a beam receiver, comprising:
   one or more memories, individually or in combination, having instructions; and
   one or more processors, individually or in combination, configured to execute the instructions and cause the apparatus to:
      receive a plurality of beam pairs including a first beam pair, wherein each beam pair is received via one of a plurality of receive elements, and wherein the first beam pair is received via a first receive element and comprises a first beam and a second beam;
      measure, at a first time instance and at a second time instance, a first beam intensity of the first beam as received by the first receive element, and a second beam intensity as received by the first receive element, wherein the second time instance occurs a preconfigured amount of time after the first time instance;
      compare a first delta between the first beam intensity and the second beam intensity at the first time instance with a second delta between the first beam intensity and the second beam intensity at the second time instance;
      if (i) a difference between the first delta and the second delta satisfies a threshold condition, and (ii) the first beam intensity and the second beam intensity at the first time instance is greater than the first beam intensity and the second beam intensity at the second time instance, generate an alarm signal; and
      if the difference between the first delta and the second delta does not satisfy the threshold condition, refrain from generating the alarm signal.

2. The apparatus of claim 1, further comprising one or more light-emitting diodes (LEDs) configured to indicate a status of the beam receiver.

3. The apparatus of claim 2, wherein the status of the beam receiver includes one or more of a trouble alarm, a fire alarm, a programming mode, a search mode, or a lock between the first receive element and a first beam transmitter.

4. The apparatus of claim 1, further comprising a housing configured to contain the plurality of receive elements, the one or more memories, and the one or more processors.

5. The apparatus of claim 4, further comprising:
   a humidity sensor configured to sense ambient humidity outside of the housing; and
   a heating element configured to generate heat internal to the housing.

6. The apparatus of claim 5, wherein the one or more processors are further configured to:
   receive, from the humidity sensor, an indication of the ambient humidity outside of the housing;
   activate the heating element if the ambient humidity satisfies a humidity threshold condition; and
   deactivate or refrain from activating the heating element if the ambient humidity does not satisfy the humidity threshold condition.

7. The apparatus of claim 1, further comprising a laser transmitter configured to align the first receive element with a first beam transmitter.

8. The apparatus of claim 1, further comprising a laser receiver configured to receive, from a first beam transmitter, a laser beam indicative of a direction of the first beam pair.

9. The apparatus of claim 1, further comprising a power over ethernet (PoE) interface configured to receive power and communicate with an external control system.

10. The apparatus of claim 1, wherein each of the plurality of receive elements is implemented as a complementary metal-oxide semiconductor (CMOS) sensor or a charge-coupled device (CCD) sensor.

11. The apparatus of claim 1, wherein the first beam is an ultra-violet (UV) light beam, and wherein the second beam is an infrared (IR) beam.

12. A method of smoke detection at a beam receiver, comprising:
   receiving a plurality of beam pairs including a first beam pair, wherein each beam pair is received via one of a plurality of receive elements, and wherein the first beam pair is received via a first receive element and comprises a first beam and a second beam;
   measuring, at a first time instance and at a second time instance, a first beam intensity of the first beam as received by the first receive element, and a second beam intensity as received by the first receive element, wherein the second time instance occurs a preconfigured amount of time after the first time instance;
   comparing a first delta between the first beam intensity and the second beam intensity at the first time instance with a second delta between the first beam intensity and the second beam intensity at the second time instance;
   if (i) a difference between the first delta and the second delta satisfies a threshold condition, and (ii) the first beam intensity and the second beam intensity at the first time instance is greater than the first beam intensity and the second beam intensity at the second time instance, generate an alarm signal; and
   if the difference between the first delta and the second delta does not satisfy the threshold condition, refrain from generating the alarm signal.

13. The method of claim 12, further comprising:

receiving, via a humidity sensor, an indication of an ambient humidity outside of the beam receiver;

activating a heating element if the ambient humidity satisfies a humidity threshold condition; and deactivating or refraining from activating the heating element if the ambient humidity does not satisfy the humidity threshold condition.

14. A smoke detection system including a beam receiver and one or more beam transmitters, wherein the beam receiver comprises:

one or more memories, individually or in combination, having instructions; and one or more processors, individually or in combination, configured to execute the instructions and cause the beam receiver to:

receive a plurality of beam pairs including a first beam pair, wherein each beam pair is received via one of a plurality of receive elements, and wherein the first beam pair is received via a first receive element and comprises a first beam and a second beam;

measure, at a first time instance and at a second time instance, a first beam intensity of the first beam as received by the first receive element, and a second beam intensity as received by the first receive element, wherein the second time instance occurs a preconfigured amount of time after the first time instance;

compare a first delta between the first beam intensity and the second beam intensity at the first time instance with a second delta between the first beam intensity and the second beam intensity at the second time instance;

if (i) a difference between the first delta and the second delta satisfies a threshold condition, and (ii) the first beam intensity and the second beam intensity at the first time instance is greater than the first beam intensity and the second beam intensity at the second time instance, generate an alarm signal; and if the difference between the first delta and the second delta does not satisfy the threshold condition, refrain from generating the alarm signal;

and each of the one or more beam transmitters comprises:

one or more memories, individually or in combination, having instructions; and one or more processors, individually or in combination, configured to execute the instructions and cause each of the one or more beam transmitters to:

radiate, via a first emitter the first beam; and radiate, via a second emitter, the second beam, wherein the first beam and the second beam are both radiated in a first direction toward the beam receiver.

15. The smoke detection system of claim 14, further comprising one or more light-emitting diodes (LEDs) configured to indicate a status of the beam receiver.

16. The smoke detection system of claim 15, wherein the status of the beam receiver includes one or more of a trouble alarm, a fire alarm, a programming mode, a search mode, or a lock between the first receive element and a first beam transmitter.

17. The smoke detection system of claim 14, further comprising a housing configured to contain the plurality of receive elements, the one or more memories, and the one or more processors.

18. The smoke detection system of claim 17, further comprising:

a humidity sensor configured to sense ambient humidity outside of the housing; and a heating element configured to generate heat internal to the housing.

19. The smoke detection system of claim 14, further comprising a laser transmitter configured to align the first receive element with a first beam transmitter.

20. The smoke detection system of claim 14, further comprising a laser receiver configured to receive, from a first beam transmitter, a laser beam indicative of a direction of the first beam pair.

* * * * *